United States Patent
Cudak et al.

(10) Patent No.: US 12,013,733 B2
(45) Date of Patent: Jun. 18, 2024

(54) RELATIVE THERMAL EFFICIENCY VALUES FOR CONTROLLING OPERATION OF ADAPTER MODULES

(71) Applicant: Lenovo Enterprise Solutions (Singapore) Pte Ltd., New Tech Park (SG)

(72) Inventors: Gary D Cudak, Raleigh, NC (US); Vinod Kamath, Raleigh, NC (US); Ajay Dholakia, Cary, NC (US); Miroslav Hodak, Raleigh, NC (US)

( * ) Notice: Subject to any disclaimer, the term of this patent is extended or adjusted under 35 U.S.C. 154(b) by 243 days.

(21) Appl. No.: 17/855,797

(22) Filed: Jul. 1, 2022

(65) Prior Publication Data

US 2024/0004440 A1 Jan. 4, 2024

(51) Int. Cl.
G06F 1/20 (2006.01)
G05B 19/4155 (2006.01)

(52) U.S. Cl.
CPC ......... *G06F 1/206* (2013.01); *G05B 19/4155* (2013.01); *G05B 2219/49216* (2013.01)

(58) Field of Classification Search
CPC ...................................................... G06F 1/206
See application file for complete search history.

(56) References Cited

U.S. PATENT DOCUMENTS

2010/0061069 A1* 3/2010 Cole .................... G02B 6/4284
361/761
2017/0150643 A1* 5/2017 Sporer ................. H05K 5/0008

FOREIGN PATENT DOCUMENTS

| CN | 1908858 A | * | 2/2007 | ............. G06F 1/184 |
| CN | 104426706 A | * | 3/2015 | |
| WO | WO-2009079036 A1 | * | 6/2009 | ............. H04L 63/20 |

* cited by examiner

*Primary Examiner* — Suresh Suryawanshi
(74) *Attorney, Agent, or Firm* — Jeffrey L. Streets

(57) ABSTRACT

A computer-implemented method includes identifying a plurality of adapter modules of a particular adapter module type that are installed in a plurality of slots of a single host computer, and identifying, for each of the identified adapter modules, a slot of the plurality of slots in which the adapter module is installed. The method may further includes accessing, for each identified slot, a predetermined relative thermal efficiency value for operation of an adapter module of the particular adapter module type in a particular slot, and controlling, for one or more of the identified adapter modules, the operation of the identified adapter module based on the predetermined relative thermal efficiency value for the slot in which the identified adapter module is installed. A computer program product may also include program instructions that are executable by a processor to cause the processor to perform the method.

20 Claims, 6 Drawing Sheets

Steady State Temperature Under Load
(Adapter Module 1 in Server ABC)

| Slot ID | Adapter Module (Type/Model) 1 |
|---|---|
| PCIe 1 | 63.6 |
| PCIe 2 | 61.6 |
| PCIe 3 | 66.3 |
| PCIe 4 | 60.3 |
| PCIe 5 | 66.9 |
| PCIe 6 | 70.0 |
| PCIe 7 | 57.8 |
| PCIe 8 | 56.8 |

*FIG. 2*

Relative Thermal Efficiency Data Generation
(Adapter Module 1 in Server ABC)

| Slot ID | Adapter Module (Type/Model) 1 | $TE_i = 1 - \left(\frac{(T_i - T_{min})}{T_i}\right)$ | TE Rank |
|---|---|---|---|
| PCIe 1 | 63.6 | 0.89 | 5 |
| PCIe 2 | 61.6 | 0.92 | 4 |
| PCIe 3 | 66.3 | 0.86 | 6 |
| PCIe 4 | 60.3 | 0.94 | 3 |
| PCIe 5 | 66.9 | 0.85 | 7 |
| PCIe 6 | 70.0 | 0.81 | 8 |
| PCIe 7 | 57.8 | 0.98 | 2 |
| PCIe 8 | 56.8 | 1 | 1 |

*FIG. 3*

Relative Thermal Efficiency Data $\left[ TE = 1 - \left( \frac{(T_i - T_{min})}{T_i} \right) \right]$
(Server Model ABC)

| Slot ID | Adapter Module (Type/Model) 1 | Adapter Module (Type/Model) 2 | Adapter Module (Type/Model) 3 | ... |
|---|---|---|---|---|
| PCIe 1 | 0.89 | 0.90 | 0.88 | |
| PCIe 2 | 0.92 | 0.93 | 1 | |
| PCIe 3 | 0.86 | 0.87 | 0.80 | |
| PCIe 4 | 0.94 | 0.91 | 0.92 | |
| PCIe 5 | 0.85 | 0.81 | 0.83 | |
| PCIe 6 | 0.81 | 0.82 | 0.78 | |
| PCIe 7 | 0.98 | 1 | 0.96 | |
| PCIe 8 | 1 | 0.99 | 0.97 | |

*FIG. 4*

Relative Thermal Efficiency Data [Rank]
(Server Model ABC)

| Slot ID | Adapter Module (Type/Model) 1 | Adapter Module (Type/Model) 2 | Adapter Module (Type/Model) 3 | ... |
|---|---|---|---|---|
| PCIe 1 | 5 | 5 | 5 | |
| PCIe 2 | 4 | 3 | 1 | |
| PCIe 3 | 6 | 6 | 7 | |
| PCIe 4 | 3 | 4 | 4 | |
| PCIe 5 | 7 | 8 | 6 | |
| PCIe 6 | 8 | 7 | 8 | |
| PCIe 7 | 2 | 1 | 3 | |
| PCIe 8 | 1 | 2 | 2 | |

*FIG. 5*

RELATIVE THERMAL EFFICIENCY VALUES FOR CONTROLLING OPERATION OF ADAPTER MODULES

BACKGROUND

The present disclosure relates to methods of operating a computer to improve thermal efficiency.

BACKGROUND OF THE RELATED ART

Substantial efforts have been made to improve the thermal efficiency of operating a computer. The design of an individual component of a computer may be improved so that the component may generate a reduced amount of heat while performing a workload. The layout of a computer may also be modified so that the flow of cool air through the computer chassis is improved and result in greater thermal efficiency. Furthermore, various components of the computer may be throttled under certain conditions in order to improve the thermal efficiency of the computer. However, the trend of packing more hardware into the same or smaller chassis poses a constant challenge to improve the thermal efficiency of the computer.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations may comprise identifying a plurality of adapter modules of a particular adapter module type that are installed in a plurality of slots of a single host computer, and identifying, for each of the identified adapter modules, a slot of the plurality of slots in which the adapter module is installed. The operation may further comprise accessing, for each identified slot, a predetermined relative thermal efficiency value for operation of an adapter module of the particular adapter module type, and controlling, for one or more of the identified adapter modules, the operation of the identified adapter module based on the predetermined relative thermal efficiency value for the slot in which the identified adapter module is installed.

Some embodiments provide a method comprising identifying a plurality of adapter modules of a particular adapter module type that are installed in a plurality of slots of a single host computer, and identifying, for each of the identified adapter modules, a slot of the plurality of slots in which the adapter module is installed. The method may further comprise accessing, for each identified slot, a predetermined relative thermal efficiency value for operation of an adapter module of the particular adapter module type, and controlling, for one or more of the identified adapter modules, the operation of the identified adapter module based on the predetermined relative thermal efficiency value for the slot in which the identified adapter module is installed.

BRIEF DESCRIPTION OF THE SEVERAL VIEWS OF THE DRAWINGS

FIG. 2 is a table illustrating steady state temperature measurements for adapter modules of a type/model 1 installed and operated under a load in PCIe slots 1-8 of the server ABC.

FIG. 3 is a table of relative thermal efficiency data generated for adapter module 1 in server ABC using both a relative thermal efficiency equation and a relative thermal efficiency ranking.

FIG. 4 is a table of calculated relative thermal efficiency values for each of a plurality of adapter modules as a function of the PCIe slot in server ABC in which they are installed and operated.

FIG. 5 is a table of relative thermal efficiency rankings for each of a plurality of adapter modules as a function of the PCIe slot in server ABC in which they are installed and operated.

DETAILED DESCRIPTION

Figure 1:
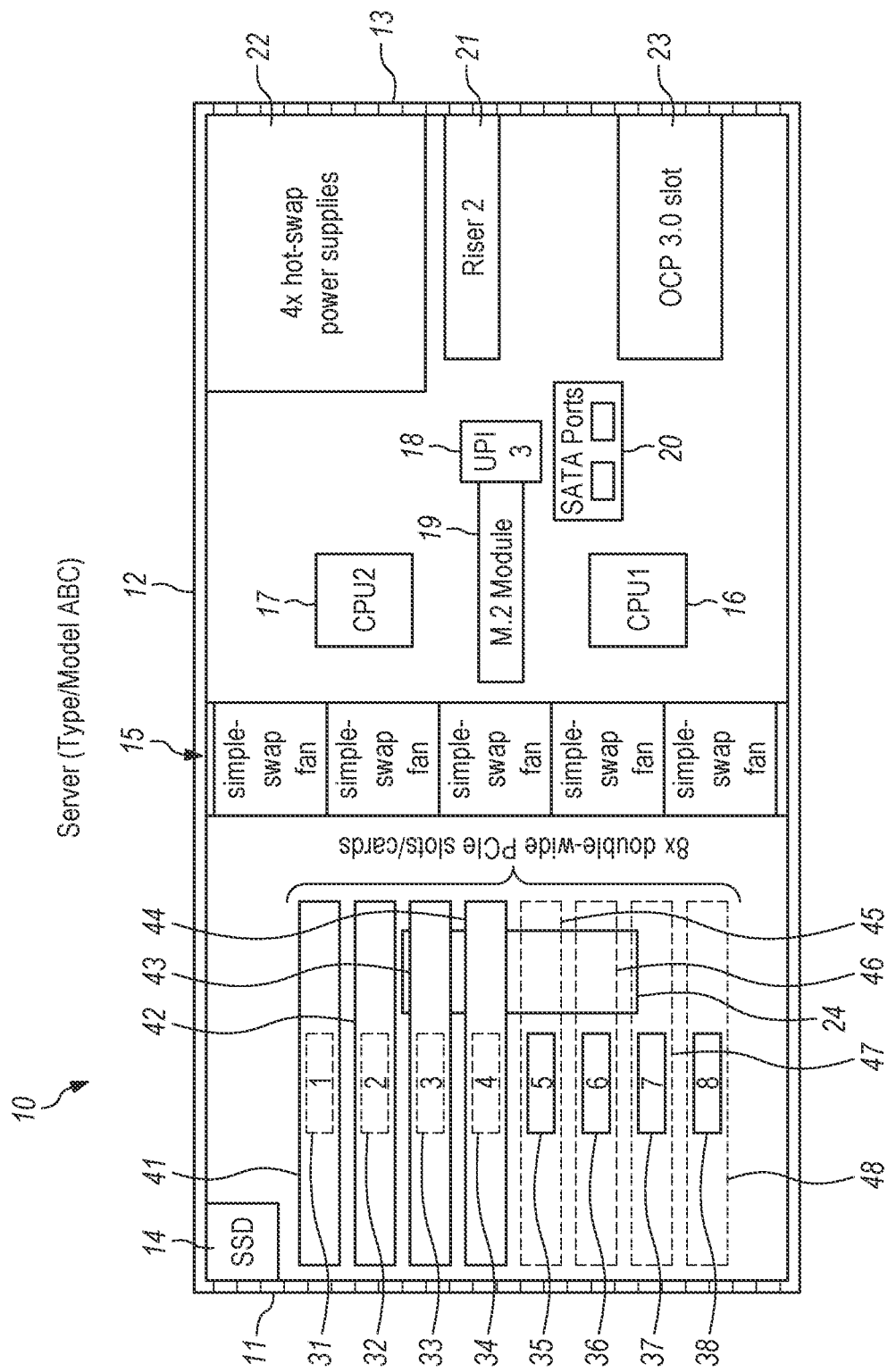
FIG. 1 is a diagram of a server of a known layout or model ABC.

Some embodiments provide a computer program product comprising a non-volatile computer readable medium and non-transitory program instructions embodied therein, the program instructions being configured to be executable by a processor to cause the processor to perform various operations. The operations may comprise identifying a plurality of adapter modules of a particular adapter module type that are installed in a plurality of slots of a single host computer, and identifying, for each of the identified adapter modules, a slot of the plurality of slots in which the adapter module is installed. The operation may further comprise accessing, for each identified slot, a predetermined relative thermal efficiency value for operation of an adapter module of the particular adapter module type, and controlling, for one or more of the identified adapter modules, the operation of the identified adapter module based on the predetermined relative thermal efficiency value for the slot in which the identified adapter module is installed.

In some embodiments, the single host computer may be a computer server. Large numbers of such computer servers may operate in a data center along with other information technology equipment. The computer servers could all be the same, but it is more likely that the data center includes computer servers with several or many different server layouts, configurations and other differences. For example, the computer servers may be obtained from different computer server manufacturers and/or may be different model numbers or versions, perhaps obtained over time as the data center has grown and the demands on the data center have evolved. Accordingly, all computer servers in the data center cannot be assumed to have the same thermal characteristics. In fact, the computer servers may have fundamental differences in the layout of components, the presence or location of baffles, the airflow capacity and placement of fans, and/or other aspects of a server configuration. However, a basic set of layout and other thermal characteristics of a host computer may be identified by the manufacturer name and model number. Optionally, the characteristics of a particular host computer may include the number and location of slots capable of supporting various adapter modules.

A single host computer may include some number of slots, such as peripheral component interconnect express (PCIe) slots, that allow the end user or system integrator to customize the inclusion of additional components into the host computer. These additional components, which may be added to the host computer by connection to the available slots, may be referred to as adapter modules. A wide variety of functionality can be added to a host computer according to the type of adapter modules that are installed in these slots. For example, the adapter modules may include, without limitation, graphics processing units (GPUs), central processing units (CPUs), data processing units (DPUs), network interface controllers (NICs), dual in-line memory modules (DIMMs), and/or solid-state drives (SSDs). In fact, a single host computer may include some combination of these types of adapter modules to fill some or all of the available slots. Depending upon the types of workloads (i.e., tasks or jobs) expected to be performed by the host computer, the selection of adapter modules may be selected to support the expected workload. As a specific example, a high-end computer server that is expected to perform artificial intelligence or bitcoin mining workloads may be configured with several adapter modules that include graphics processing units. Other computer servers in the same data center may include the same or different computer server models configured with adapter modules including multiple network interface controllers and/or multiple solid-state drives. In some embodiments, the slot may be a socket, such as a CPU socket. Accordingly, the relative thermal efficiency of a CPU type/model as a function of the socket location (socket identifier) may be similarly determined and used to improve thermal efficiency in the operation of the CPUs.

In the context of a host computer, the term "thermal efficiency" refers to the amount workload that can be performed for a given amount of heat generation. A first component of the host computer (i.e., a first adapter module) may have a higher "thermal efficiency" than a second component of the host computer (i.e., a second adapter module) if the first component can perform a greater number of operations than the second component for the same amount of heat generation or, restated, if the first component can perform the same number of operations as the second component while generating less heat.

Some embodiments may determine a "relative thermal efficiency" between two adapter modules of the same adapter module type in a given host computer by causing the two adapter modules to perform the same amount of workload (i.e., the same number of operations per unit of time) and measure a steady state temperature of each adapter module. Since the two adapter modules are of the same adapter module type (i.e., two units of the same adapter module), the thermal performance of the two adapter modules should be substantially identical such that any measurable difference in the temperature of the two adapter modules may be attributable to a difference in operating conditions at the slot locations where the two adapter modules are installed and operated. For example, the operating conditions that can cause two adapter modules of the same type to experience a variation in thermal efficiency from one slot location to another slot location within the same host computer may include adjacent baffling within the host computer chassis, airflow anomalies (speed, direction, etc.), fan placement and/or preheating of airflow by upstream components in the same host computer. Embodiments may determine relative thermal efficiency values for a particular type of adapter module as a function of a slot identifier (i.e., slot location) and host computer type (i.e., computer manufacturer and model). In one option, temperature measurements of the adapter modules may be used as the basis for determining relative thermal efficiency values that are subsequently used to control the operation of one or more adapter module of the same type.

In some embodiments, the operation of controlling, for one or more of the identified adapter modules, the operation of the identified adapter module based on the predetermined relative thermal efficiency value for the slot in which the identified adapter module is installed may include prioritizing distribution of workload to the identified adapter modules in descending order of the predetermined relative thermal efficiency for the slot in which the identified adapter modules are installed. For example, a host operating system running in the host computer may access the predetermined relative thermal efficiency values that are relevant to the host computer type and the type of adapter modules installed in the host computer, then use these values making workload distribution decisions. One possibility is that the host operating system will prioritize assignment of workload to a CPU and/or a memory DIMM that have greater relative thermal efficiency values than other CPUs and/or memory DIMM in the single host computer.

In some embodiments, the operation of controlling, for one or more of the identified adapter modules, the operation of the identified adapter module based on the predetermined relative thermal efficiency value for the slot in which the identified adapter module is installed may include assigning roles to one or more of the identified adapter modules. For example, the operation may include identifying that a first one of the identified adapter modules has a higher relative thermal efficiency than a second one of the identified adapter modules, assigning the first one of the identified adapter modules to operate as an active (or "primary") module in an active/passive pair of modules, and assigning the second one of the identified adapter modules to operate as a passive (or "failover") module in the active/passive pair of modules, wherein the second one of the identified adapter modules will automatically begin operating as the active module in response to failure of the first one of the identified adapter modules. In this example, since the first adapter module operating in a first slot has a higher relative thermal efficiency value (i.e., is more thermally efficient) than the second adapter module operating in a second slot, then placing a greater portion of the workload on the first adapter module will result in greater thermal efficiency for the overall host computer than an equal or random distribution of the workload among the first and second adapter modules.

In some embodiments, the identified adapter modules are solid state drives, and wherein controlling, for one or more of the identified adapter modules, the operation of the identified adapter module based on the predetermined relative thermal efficiency value for the slot in which the identified adapter module is installed may include identifying that a first one of the identified solid-state drives has a higher relative thermal efficiency than a second one of the identified solid-state drives, assigning the first one of the identified solid-state drives to operate in a hot tier of solid-state drives, and assigning the second one of the identified solid-state drives to operate in a cold tier (or relatively cooler tier) of solid-state drives, wherein the hot tier of solid-state drives is accessed more frequently than the cold tier of solid-state drives. Assigning the solid-state drive with the greater thermal efficiency to the hot tier will result in greater overall thermal efficiency for the solid-state drives than other arrangements, such as randomly assigning the solid-state drive with the lower thermal efficiency to the hot tier.

In some embodiments, the operation of accessing, for each identified slot, a predetermined relative thermal efficiency value for operation of an adapter module of the particular adapter module type may include querying a baseboard management controller installed in the single host computer for the predetermined relative thermal efficiency value, wherein the predetermined relative thermal efficiency value for each identified slot is stored by the baseboard management controller. Optionally, the baseboard management controller may obtain or download the predetermined relative thermal efficiency values that are relevant to the particular host server and/or the particular adapter modules in the from a remote source or database where there is a collection of relative thermal efficiency values. Specifically, the operations may include determining one or more adapter module type for which there are multiple adapter modules installed in the single host computer, and downloading, for each of the determined one or more adapter module types, predetermined relative thermal efficiency values for the adapter module type. A collection of predetermined relative thermal efficiency values may be sourced from a computer lab or third-party service that performs the relative thermal efficiency value determination. Furthermore, the baseboard management controller may store the predetermined relative thermal efficiency values for a plurality of adapter module types installed and operated in the plurality of slots of a particular host computer type including the single host computer. The host operating system of the single host computer may query the baseboard management controller for one or more of the predetermined relative thermal efficiency values as needed to make various operational decisions. Optionally, the baseboard management controller does not need to store predetermined relative thermal efficiency values for any other host computer type and/or adapter module types are not included in the single host computer. It should be understood that the term "baseboard management controller" is used in a general sense to include various models and functionalities of management controllers within a host computer, including Lenovo's XClarity Controller (XCC).

In some embodiments, the operation of accessing, for each identified slot, a predetermined relative thermal efficiency value for operation of an adapter module of the particular adapter module type may include reading the predetermined relative thermal efficiency value from a Unified Extensible Firmware Interface (UEFI) installed on the single host computer, wherein the predetermined relative thermal efficiency value for each identified slot is stored by the Unified Extensible Firmware Interface in association with the adapter module type. The UEFI loads prior to the operating system during a boot process, such that the predetermined relative thermal efficiency values will be accessible to the operating system at any time such values are needed by the operating system. In one option, the predetermined relative thermal efficiency values may be stored in Peripheral Component Interconnect Express data fields provided in Unified Extensible Firmware Interface.

In some embodiments, the predetermined relative thermal efficiency value for operation of an adapter module of the particular adapter module type may be a thermal efficiency ranking, and the thermal efficiency ranking is implemented by altering an order in which the adapter modules or adapter module slots are stored in the Basic Input/Output System (BIOS) and presented to the operating system (OS). Accordingly, the operating system will initially choose to use the first ordered adapter module or adapter module slot for workload prioritization and/or active/passive failover pairs. For example, changing the order of adapter modules or adapter module slots in the BIOS to represent the thermal efficiency ranking of the adapter modules or adapter module slots will cause the operating system to use the adapter modules in a more thermally efficient manner without changing the operating system. The operating system may simply prioritize using the first adapter module or adapter module slot identified in the BIOS rather than using a particular adapter module simply because of its slot number.

In some embodiments, relative thermal efficiency values may be predetermined in a controlled environment, such as a computer lab, prior to use by the single host computer. The operations of a method may include installing a plurality of second adapter modules of the particular adapter module type in a plurality of slots of a host computer of a known type, which is preferably the same type as the single host computer that subsequently makes use of the relative thermal efficiency values. The method may further include measuring a steady state temperature each of the plurality of the second adapter modules while operating each of the plurality of the second adapter modules under a similar load. It is then possible to determine, for each of the plurality of slots in the second host computer, a predetermined relative thermal efficiency value for the particular adapter module type based on the measured steady state temperature of the second adapter module operating in the slot relative to lowest of the measured steady state temperatures for any of the second adapter modules operating in any of the slots the second host computer.

In one option, the method of determining relative thermal efficiency values may include installing a plurality of adapter modules of the same type (i.e., "like adapters) in multiple slots of a given server type and operating the adapter modules simultaneously under the same load. For example, adapter modules may be determined to be the same type if they have the same manufacturer and model identifier, and a host computer or server type may be identified by the server manufacturer and/or model identifier. During operation under the same load, the temperature of each adapter module is monitored and allowed to come to a steady state temperature. Differences in the temperature of the adapter modules of the same type from one slot to another is an indication of a unique relative thermal efficiency associated with operating the adapter module in a particular slot. Accordingly, a relative thermal efficiency value may be determined for each slot in which the adapter modules are located. In one option, the relative thermal efficiency of each adapter/slot combination may be a value that is calculated based on the steady state temperature of the adapter/slot combination and the lowest steady state temperature of any of the adapter/slot combinations. Without limitation, the temperature measurements for a given adapter module may be taken from a temperature sensor within the adapter module or a temperature sensor built into a cable connector for a cable that is connected to the adapter module.

In some embodiments, the relative thermal efficiency values may be calculated from the steady state temperatures of the adapter modules of the same type measured during operation under the same load. For example, a normalized relative thermal efficiency for a particular adapter module type in a particular slot of a particular host computer type may be calculated using the following equation:

$$TE_i = 1 - ((T_i - T_{min})/T_i)$$

where: $TE_i$ is the thermal efficiency of the adapter module in slot number i;

$T_i$ is the steady state temperature of the adapter module in slot number i; and $T_{min}$ is the steady state temperature of the adapter having the lowest temperature of any of the adapter modules in the evaluation.

For example, assume that a particular server type had three slots with adapter modules of the same type that ran the same load and had measured steady state temperatures of 60 (adapter/slot 1), 70 (adapter/slot 2) and 80 (adapter/slot 3) degrees, respectively. Adapter/slot 1 has the lowest temperature, so $T_{min}=T_i=60$ degrees. Using the foregoing equation, $TE_1=1$, $TE_2=0.86$, and $TE_3=0.75$. Here, for the particular server type and the particular adapter module type, the adapter module in slot 1 has the greatest relative thermal efficiency. The lower relative thermal efficiency values of the adapter modules in slots 2 and 3 are represented by the lower value of $TE_2$ and $TE_3$.

In some embodiments, the predetermined relative thermal efficiency values for the adapter modules in particular slots may be a normalized value based on a most thermally efficient slot. In one example, the adapter module and the particular slot that provide the most thermally efficient operation may have a predetermined relative thermal efficiency value of one (1), and other adapter modules of the same type in other slots of the host computer will receive predetermined relative thermal efficiency values that are less than one (<1). In some other embodiments, the predetermined relative thermal efficiency values of the adapter modules in particular slots may be a simple ranking. For example, an adapter slot having the greatest relative thermal efficiency among the tested adapter/slot combinations may be assigned a rank of 1 and each other adapter/slot may be assigned an incrementally greater number (i.e., 2, then 3, then 4, . . . ) indicating a lower rank. Of course, ranking may be ascending or descending order.

For a given server type (perhaps identified by a server model identifier), a relative thermal efficiency value may be determined for a plurality of adapter module types and/or models as a function of each individual "slot" available within the server where the adapter module may be installed. For example, each slot within the server may have an assigned slot identifier, such as slot 1, slot 2, etc. If the server has more than one adapter module of a particular adapter module type (i.e., a "group" of like adapter modules) installed within the server (such as 3 GPU modules of the same type, such as Nvidia model A100 GPUs), then the relative thermal efficiency values for the server type, adapter module type and slot identifiers may be used to determine how to operate those adapter modules in a thermal efficiency manner.

Accordingly, the relative thermal efficiency value is a function of the adapter module type, the slot location (slot identifier), and the server type, where the server type indicates a particular layout of components and slots. While the relative thermal efficiency value is affected by the physical system configuration surrounding the slot, such as any baffling, airflow speed/direction, fan placement and/or air preheating by upstream devices, the relative thermal efficiency value is also affected by the type of adapter module that may be installed and operated in the slot. For example, a large GPU module may impact the overall airflow and heat generation in the area immediately surrounding and/or downstream of the slot where it is installed and operated.

Some embodiments provide a method comprising identifying a plurality of adapter modules of a particular adapter module type that are installed in a plurality of slots of a single host computer, and identifying, for each of the identified adapter modules, a slot of the plurality of slots in which the adapter module is installed. The method may further comprise accessing, for each identified slot, a predetermined relative thermal efficiency value for operation of an adapter module of the particular adapter module type, and controlling, for one or more of the identified adapter modules, the operation of the identified adapter module based on the predetermined relative thermal efficiency value for the slot in which the identified adapter module is installed.

The foregoing methods may further include any one or more of the operations of the computer program product described herein. Accordingly, a separate description of the operations will not be duplicated in the context of the method. Similarly, the foregoing computer program products may further include program instructions to implement or initiate operations corresponding to any one or more aspects of the methods described herein.

FIG. 1 is a plan view of a host computer 10 of a known layout or model, such as a server model ABC. In this non-limiting example, the host computer 10 is contained in a chassis 12 having air vents on the ends 11, 13 (left and right in this illustration). Inside the chassis 12 are a wide variety of components, including a solid-sate drive (SSD) 14, a set of five simple-swap fans 15, a first central processing unit (CPU 1) 16, a second central processing unit (CPU 2) 17, an Ultra Path Interconnect (UPI) 3 cable or other point-to-point processor interconnect 18, an M.2 module 19, a set of SATA ports 20, a riser 21, four hot-swap power supplies 22, an Open Compute Project (OCP) 3.0 slot 23, and a Peripheral Component Interconnect Express (PCIe) switch 24, without limitation. Other components, connectors, cables and structural components may not be shown. However, the components illustrated should emphasize that there are numerous physical obstructions and heat sources that affect the air flow speed, direction and temperature at any given location within the chassis 12.

The host computer 10 further includes a set of eight (8) Peripheral Component Interconnect Express (PCIe) slots or connectors 31-38 (Slot identifiers 1-8). Four of the slots 31-34 (shown in dashed lines) are illustrated with adapter modules 41-44 installed or connected thereto. The remaining four slots 35-38 are illustrated without adapter modules, but dashed lines are used to show where adapter modules 45-48 could be installed or connected. The host computer 10 could be configured with adapter modules filling any number of the slots 31-38, from zero adapter modules to either adapter modules. However, embodiments described herein are most beneficial for configurations having at least two adapter modules of the same adapter module type. Specifically, there could be eight adapter modules of the same adapter type and no other adapter modules. Alternatively, there could be two adapter modules of each of four different adapter types (i.e., four sets of two adapter modules of the same adapter module type). Furthermore, there could be many other possible combinations of adapter modules that could be connected in the eight slots of the host computer configuration shown.

FIG. 2 is a table 50 illustrating steady state temperature measurements (column 52) for eight adapter modules of an adapter module type (model 1) installed and operated under a load in PCIe slots 1-8 (column 54) of the host computer 10 (server model ABC) shown in FIG. 1. The steady state temperature of each adapter module may be measured while operating each of the adapter modules under a similar load. Differences in the temperature of the adapter modules of the same type while operating under the same load is an indication of a unique relative thermal efficiency associated with operating the adapter module in a particular slot.

FIG. 3 is a table 60 of relative thermal efficiency data generated for adapter module 1 in server ABC (see table 50 in FIG. 2) using both a relative thermal efficiency equation and a relative thermal efficiency ranking. The two columns 52, 54 from table 50 are repeated in FIG. 3 for convenient reference when determining a relative thermal efficiency value for each slot in which the adapter modules are located. In reference to column 62, the relative thermal efficiency of each adapter/slot combination may be a value that is calculated based on the steady state temperature of the adapter/slot combination and the lowest steady state temperature of any of the adapter/slot combinations. It is then possible to determine, for each of the plurality of slots in the host computer, a predetermined relative thermal efficiency value for the particular adapter module type based on the measured steady state temperature of the adapter module operating in the slot relative to lowest of the measured steady state temperatures for any of the adapter modules operating in any of the slots the second host computer.

In the example equation used in column 62, $TE_i = 1 - ((T_i - T_{min})/T_i)$, $TE_i$ is the thermal efficiency of the adapter module in slot number I, $T_i$ is the steady state temperature of the adapter module in slot number I, and $T_{min}$ is the steady state temperature of the adapter having the lowest temperature of any of the adapter modules in the evaluation. In this illustration, $T_{min} = 56.8$ because the adapter module in PCIe slot 8 has a steady state temperature of 56.8 degrees and all of the other adapter modules in PCIe slots 1-7 have steady state temperatures that are higher. Accordingly, the adapter module in slot 8 has a relative thermal efficiency value of 1 and the adapter modules in slots 1-7 have relative thermal efficiency values less than 1 in proportion to their steady state temperature. Other alternative equations may be similarly implemented.

In reference to column 64, the relative thermal efficiency values are a ranking of slots, in descending order, where the adapter modules are operated. For example, the adapter module in PCIe slot 8 is the most thermally efficient, the adapter module in PCIe slot 7 is the second most thermally efficient, the adapter module in PCIe slot 4 is the third most thermally efficient, etc.

FIG. 4 is a table 70 of calculated relative thermal efficiency values for each of a plurality of adapter modules (adapter module models 1, 2 and 3) as a function of the PCIe slot in server ABC in which they are installed and operated. The table 70 or alternative data structure may be stored by a baseboard management controller or unified extensible firmware interface for use by a host operating system of a single host computer. Preferably, the single host computer that uses the data in table 70 will have the same server type (model ABC) and one or more of the same adapter module types.

Table 70 includes column 54 identifying the slot identifiers of slots within the host computer, column 62 from table 60 of FIG. 3 showing the calculated relative thermal efficiencies of operating an adapter module of type 1 in each of the slots, as well as additional column 72 showing the calculated relative thermal efficiencies of operating an adapter module of type 2 in each of the slots, and a further column 74 showing the calculated relative thermal efficiencies of operating an adapter module of type 3 in each of the slots. The data in columns 72, 74 may be independently determined in the same manner as the data in column 62, except that the adapter modules are type 2 and type 3 adapter modules. As a result, the relative thermal efficiency data of table 70 may be used by a host operating system to make operating decisions regarding any of the adapter module types 1, 2 and/or 3 that may have multiple unit installed in the host computer. Optionally, a relative thermal efficiency value may also be referred to as an "ease-to-cool ratio", where a value of 1 represents the most-easy to cool slot for supporting an adapter module and decimal values less than 1 are less-easy to cool.

In a simple example, assume that a host computer that is a server model ABC has two adapter modules of adapter module type 1 installed in slots 1 and 2, and also has two adapter modules of adapter module type 2 installed in slots 3 and 4. Using the data in table 70, column 62 provides relative thermal efficiency (TE) values for adapter modules of type 1. In column 62, slot 1 can support an adapter module of type 1 with a TE value of 0.89 and slot 2 can support an adapter module of type 1 with a TE value of 0.92. Accordingly, if the operating system has workload that should be performed by an adapter module of type 1, then the operating system may give priority to assigning that workload to the adapter module in slot 2 since it will be more thermally efficient. Using the data in table 70, column 72 provides relative thermal efficiency (TE) values for adapter modules of type 2. In column 72, slot 3 can support an adapter module of type 2 with a TE value of 0.87 and slot 4 can support an adapter module of type 2 with a TE value of 0.91. Accordingly, if the operating system has workload that should be performed by an adapter module of type 2, then the operating system may give priority to assigning that workload to the adapter module in slot 4 since it will be more thermally efficient.

FIG. 5 is a table 80 of relative thermal efficiency rankings for each of a plurality of adapter modules (adapter module models 1, 2 and 3) as a function of the PCIe slot in server ABC in which they are installed and operated. The ranking in table 80 may provide substantially the same information as table 70, except that rankings are provided rather than calculated values for the relative thermal efficiencies. Specifically, table 80 includes column 54 identifying the slot identifiers of slots within the host computer, column 64 from table 60 of FIG. 3 showing the relative thermal efficiency rankings of operating an adapter module of type 1 in each of the slots, as well as additional column 82 showing the relative thermal efficiency rankings of operating an adapter module of type 2 in each of the slots, and a further column 84 showing the relative thermal efficiency rankings of operating an adapter module of type 3 in each of the slots.

In reference to the simple example described above in reference to FIG. 4, it should be noted that the same result is achieved with table 80 as with table 70. The difference is that table uses rankings in ascending order, such that the most thermally efficient slot for operating a particular type of adapter module is represented by the lowest rank (i.e., rank 1 is the most thermally efficient slot). Specifically, column 64 may be used to identify that slot 2 has a TE rank of 4 and slot 1 has a TE rank of 5, such that the adapter module in slot 2 should be prioritized for workload to be done by an adapter module of type 1. Column 82 may be used to identify that slot 3 has a TE rank of 6 and slot 4 has a TE rank of 4, such that the adapter module in slot 4 should be prioritized for workload to be done by an adapter module of type 2. Still further, if the operating system were establishing active/passive pairings, the adapter modules in slots 1 and 2 having the adapter module type 1 would be paired with the adapter module of slot 2 being the active module, and/or the adapter modules in slots 3 and 4 having the adapter module type 2 would be paired with the adapter module of slot 4 being the active module.

Figure 6:
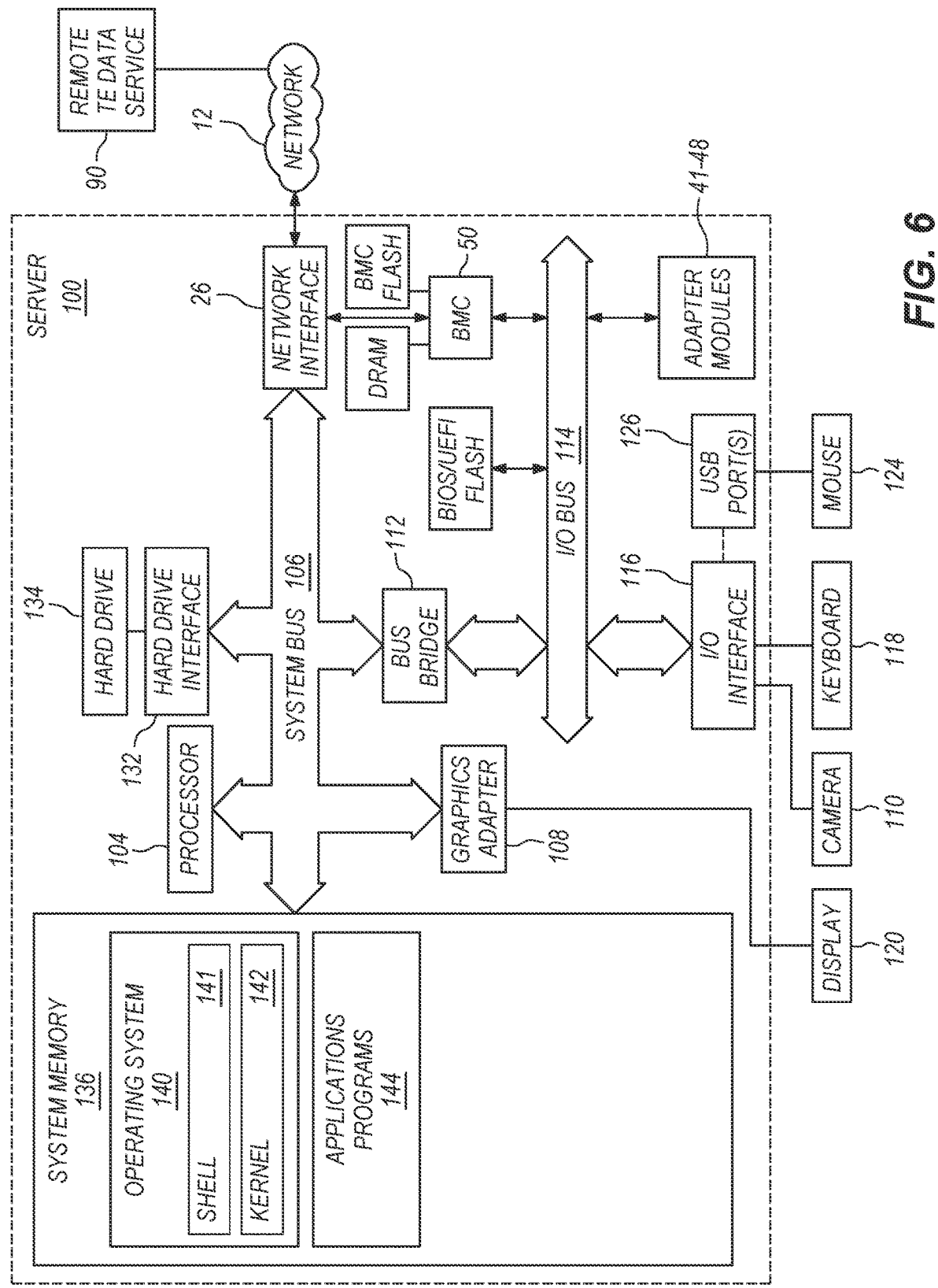
FIG. 6 is a diagram of a computer server according to some embodiments.

FIG. 6 is a diagram of a computer server 100 that may be representative of the host computer 10 (Server ABC) shown in FIG. 1. The server 100 includes a processor unit 104 that is coupled to a system bus 106. The processor unit 104 may utilize one or more processors, each of which has one or more processor cores. An optional graphics adapter 108, which may drive/support an optional display 120, is also coupled to system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices, such as a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over the network 12 using a network adapter or network interface controller 130. For example, the server 100 may be a host computer that communicates with a remote relative thermal efficiency (TE) data service 90 that stores relative thermal efficiency values for various types of host computers that may operate various types of adapter modules in any of the slots of the host computers. In one example, the remote TE data service 90 may provide requested TE data to a BMC 50 of the server 100. The BMC 50 may subsequently provide the TE data to the operating system 140 for use in making various operating decisions.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include the operating system (OS) 140 and application programs 144. The hardware elements depicted in the server 100 are not intended to be exhaustive, but rather are representative.

The operating system 114 includes a shell 141 for providing transparent user access to resources such as application programs 144. Generally, the shell 141 is a program that provides an interpreter and an interface between the user and the operating system. More specifically, the shell 141 may execute commands that are entered into a command line user interface or from a file. Thus, the shell 141, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 141 may be a text-based, line-oriented user interface, the present invention may support other user interface modes, such as graphical, voice, gestural, etc.

As depicted, the operating system 140 also includes the kernel 142, which includes lower levels of functionality for the operating system 140, including providing essential services required by other parts of the operating system 140 and application programs 144. Such essential services may include memory management, process and task management, disk management, and mouse and keyboard management. In addition, the computer 100 may include application programs 144 stored in the system memory 136.

The server 100 may further include a management processor, such as the baseboard management controller (BMC) 50. The BMC is considered to be an out-of-band controller and may monitor and control various components of the server 100. However, the BMC may also communicate with various devices via the network interface 26 and network 12, such as to contact the remote TE data service 90 and download TE data that is relevant to the particular server type of the server 100. Still further, the server 100 may include some number of adapter modules 41-48 as shown in FIG. 1.

Figure 7:
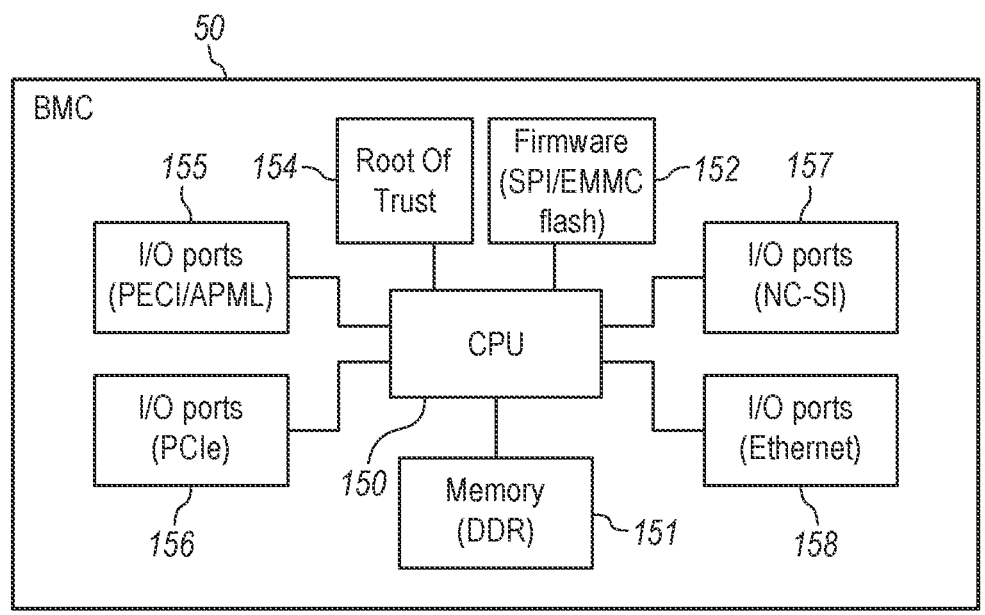
FIG. 7 is a diagram of the baseboard management controller (BMC) according to some embodiments.

FIG. 7 is a diagram of the baseboard management controller (BMC) 50 according to some embodiments. The BMC 50 is similar to a small computer or system on a chip (SoC), including a central processing unit (CPU) 150 (which is a separate entity from the central processing units 16, 17 in FIG. 1 and processor 104 of FIG. 6), memory 151 (such as random-access memory (RAM) on a double data rate (DDR) bus), firmware 152 on a flash memory (such as an embedded multi-media card (eMMC) flash memory or a serial peripheral interface (SPI) flash memory), and a root of trust (RoT) chip 154. The BMC 50 further includes a wide variety of input/output ports. For example, the input/output (I/O) ports may include I/O ports 155 to the hardware components of the server, such as a Platform Environment Control Interface (PECI) port and/or an Advanced Platform Management Link (APML) port; I/O ports 156 to the hardware components of the servers and/or a network interface controller (NIC), such as a Peripheral Component Interconnect Express (PCIe) port; I/O ports 77 to the NIC, such as a network controller sideband interface (NC-SI) port; and I/O ports 158 to a network that accessible to an external user, such as an Ethernet port. The BMC 50 may use any one or more of these I/O ports to interact with hardware devices installed on the server to identify the adapter modules that are installed in the host computer.

Figure 8:
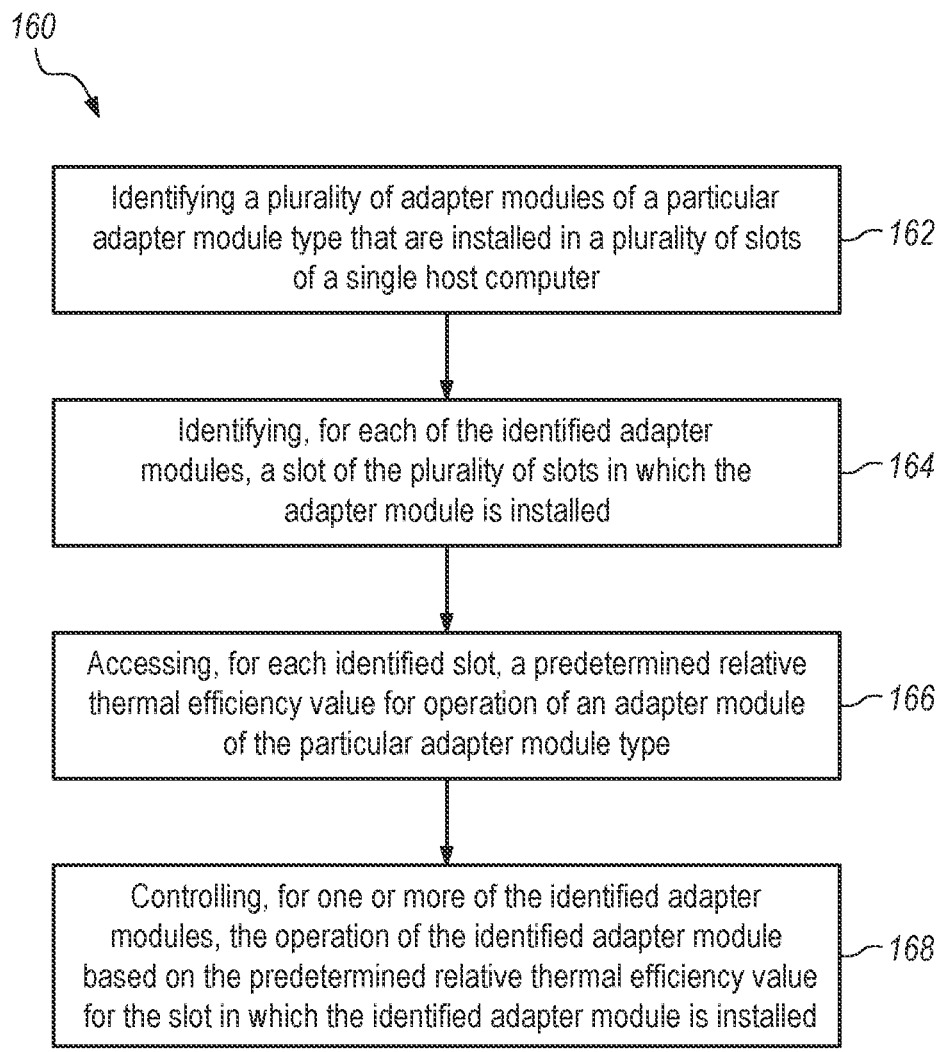
FIG. 8 is a flowchart of operations according to some embodiments.

FIG. 8 is a flowchart of operations 160 according to some embodiments. Operation 162 includes identifying a plurality of adapter modules of a particular adapter module type that are installed in a plurality of slots of a single host computer. Operation 164 includes identifying, for each of the identified adapter modules, a slot of the plurality of slots in which the adapter module is installed. Operation 166 includes accessing, for each identified slot, a predetermined relative thermal efficiency value for operation of an adapter module of the particular adapter module type. Operation 168 includes controlling, for one or more of the identified adapter modules, the operation of the identified adapter module based on the predetermined relative thermal efficiency value for the slot in which the identified adapter module is installed.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:

identifying a plurality of adapter modules of a particular adapter module type that are installed in a plurality of slots of a single host computer;

identifying, for each of the identified adapter modules, a slot of the plurality of slots in which the adapter module is installed;

accessing, for each identified slot, a predetermined relative thermal efficiency value for operation of an adapter module of the particular adapter module type; and controlling, for one or more of the identified adapter modules, the operation of the identified adapter module based on the predetermined relative thermal efficiency value for the slot in which the identified adapter module is installed.

2. The computer program product of claim 1, wherein controlling, for one or more of the identified adapter modules, the operation of the identified adapter module based on the predetermined relative thermal efficiency value for the slot in which the identified adapter module is installed includes:
prioritizing distribution of workload to the identified adapter modules in descending order of the predetermined relative thermal efficiency for the slot in which the identified adapter modules are installed.

3. The computer program product of claim 2, wherein the identified adapter modules are dual in-line memory modules or solid-state drives.

4. The computer program product of claim 2, wherein the identified adapter modules are central processing units, data processing units, or graphics processing units.

5. The computer program product of claim 2, wherein the identified adapter modules are network interface controllers.

6. The computer program product of claim 1, wherein controlling, for one or more of the identified adapter modules, the operation of the identified adapter module based on the predetermined relative thermal efficiency value for the slot in which the identified adapter module is installed includes:
identifying that a first one of the identified adapter modules has a higher relative thermal efficiency than a second one of the identified adapter modules;
assigning the first one of the identified adapter modules to operate as an active module in an active/passive pair of modules; and
assigning the second one of the identified adapter modules to operate as a passive module in the active/passive pair of modules, wherein the second one of the identified adapter modules will automatically begin operating as the active module in response to failure of the first one of the identified adapter modules.

7. The computer program product of claim 1, wherein the identified adapter modules are solid state drives, and wherein controlling, for one or more of the identified adapter modules, the operation of the identified adapter module based on the predetermined relative thermal efficiency value for the slot in which the identified adapter module is installed includes:
identifying that a first one of the identified solid-state drives has a higher relative thermal efficiency than a second one of the identified solid-state drives;
assigning the first one of the identified solid-state drives to operate in a hot tier of solid-state drives; and
assigning the second one of the identified solid-state drives to operate in a cold tier of solid-state drives, wherein the hot tier of solid-state drives is accessed more frequently than the cold tier of solid-state drives.

8. The computer program product of claim 1, wherein accessing, for each identified slot, a predetermined relative thermal efficiency value for operation of an adapter module of the particular adapter module type includes:
querying a baseboard management controller installed in the single host computer for the predetermined relative thermal efficiency value, wherein the predetermined relative thermal efficiency value for each identified slot is stored by the baseboard management controller.

9. The computer program product of claim 8, wherein the baseboard management controller stores the predetermined relative thermal efficiency values for a plurality of adapter module types installed and operated in the plurality of slots of a particular host computer type including the single host computer and does not store predetermined relative thermal efficiency values for any other host computer type.

10. The computer program product of claim 1, wherein accessing, for each identified slot, a predetermined relative thermal efficiency value for operation of an adapter module of the particular adapter module type includes:
reading the predetermined relative thermal efficiency value from a Unified Extensible Firmware Interface installed on the single host computer, wherein the predetermined relative thermal efficiency value for each identified slot is stored by the Unified Extensible Firmware Interface in association with the adapter module type.

11. The computer program product of claim 10, wherein the predetermined relative thermal efficiency value is stored in Peripheral Component Interconnect Express data fields in Unified Extensible Firmware Interface.

12. The computer program product of claim 1, wherein the predetermined relative thermal efficiency value for each slot is a normalized value based on a most thermally efficient slot.

13. The computer program product of claim 1, wherein the predetermined relative thermal efficiency value for each slot is a ranking of each slot in order of thermal efficiency.

14. The computer program product of claim 1, the operations further comprising:
determining one or more adapter module type for which there are multiple adapter modules installed in the single host computer; and
downloading, for each of the determined one or more adapter module types, predetermined relative thermal efficiency values for the adapter module type.

15. A method, comprising:
identifying a plurality of adapter modules of a particular adapter module type that are installed in a plurality of slots of a single host computer;
identifying, for each of the identified adapter modules, a slot of the plurality of slots in which the adapter module is installed;
accessing, for each identified slot, a predetermined relative thermal efficiency value for operation of an adapter module of the particular adapter module type; and
controlling, for one or more of the identified adapter modules, the operation of the identified adapter module based on the predetermined relative thermal efficiency value for the slot in which the identified adapter module is installed.

16. The method of claim 15, wherein controlling, for one or more of the identified adapter modules, the operation of the identified adapter module based on the predetermined relative thermal efficiency value for the slot in which the identified adapter module is installed includes:
prioritizing distribution of workload to the identified adapter modules in descending order of the predetermined relative thermal efficiency for the slot in which the identified adapter modules are installed.

17. The method of claim 15, wherein controlling, for one or more of the identified adapter modules, the operation of the identified adapter module based on the predetermined relative thermal efficiency value for the slot in which the identified adapter module is installed includes:
identifying that a first one of the identified adapter modules has a higher relative thermal efficiency than a second one of the identified adapter modules;

assigning the first one of the identified adapter modules to operate as an active module in an active/passive pair of modules; and assigning the second one of the identified adapter modules to operate as a passive module in the active/passive pair of modules, wherein the second one of the identified adapter modules will automatically begin operating as the active module in response to failure of the first one of the identified adapter modules.

18. The method of claim 15, wherein the identified adapter modules are solid state drives, and wherein controlling, for one or more of the identified adapter modules, the operation of the identified adapter module based on the predetermined relative thermal efficiency value for the slot in which the identified adapter module is installed includes:

identifying that a first one of the identified solid-state drives has a higher relative thermal efficiency than a second one of the identified solid-state drives;

assigning the first one of the identified solid-state drives to operate in a hot tier of solid-state drives; and assigning the second one of the identified solid-state drives to operate in a cold tier of solid-state drives, wherein the hot tier of solid-state drives is accessed more frequently than the cold tier of solid-state drives.

19. The method of claim 15, wherein accessing, for each identified slot, a predetermined relative thermal efficiency value for operation of an adapter module of the particular adapter module type includes:

querying a baseboard management controller installed in the single host computer for the predetermined relative thermal efficiency value, wherein the predetermined relative thermal efficiency value for each identified slot is stored by the baseboard management controller.

20. The method of claim 15, further comprising:

installing a plurality of second adapter modules of the particular adapter module type in a plurality of slots of a second host computer of the same type as the single host computer;

measuring a steady state temperature each of the plurality of the second adapter modules while operating each of the plurality of the second adapter modules under a similar load; and determining, for each of the plurality of slots in the second host computer, the predetermined relative thermal efficiency value for the particular adapter module type based on the measured steady state temperature of the second adapter module operating in the slot relative to lowest of the measured steady state temperatures for any of the second adapter modules operating in any of the slots the second host computer.

* * * * *